United States Patent
Wang et al.

(10) Patent No.: US 10,482,126 B2
(45) Date of Patent: Nov. 19, 2019

(54) DETERMINATION OF SIMILARITY BETWEEN VIDEOS USING SHOT DURATION CORRELATION

(71) Applicant: Google LLC, Mountain View, CA (US)

(72) Inventors: Yongzhe Wang, San Jose, CA (US); Anthony Mai, Mountain View, CA (US)

(73) Assignee: Google LLC, Mountain View, CA (US)

( * ) Notice: Subject to any disclaimer, the term of this patent is extended or adjusted under 35 U.S.C. 154(b) by 357 days.

(21) Appl. No.: 15/365,699

(22) Filed: Nov. 30, 2016

(65) Prior Publication Data

US 2018/0150469 A1 May 31, 2018

(51) Int. Cl.
| | |
|---|---|
| *G06F 16/78* | (2019.01) |
| *G06F 16/783* | (2019.01) |
| *G06F 16/738* | (2019.01) |
| *G06F 16/9535* | (2019.01) |
| *G06K 9/00* | (2006.01) |

(52) U.S. Cl.
CPC ........ *G06F 16/7837* (2019.01); *G06F 16/738* (2019.01); *G06F 16/9535* (2019.01); *G06K 9/00744* (2013.01); *G06K 9/00758* (2013.01); *G06K 9/00765* (2013.01)

(58) Field of Classification Search
CPC . G06F 16/7837; G06F 16/738; G06F 16/9535
See application file for complete search history.

(56) References Cited

U.S. PATENT DOCUMENTS

| | | | | |
|---|---|---|---|---|
| 6,549,643 | B1* | 4/2003 | Toklu | G06K 9/00751 382/107 |
| 6,774,917 | B1* | 8/2004 | Foote | G06K 9/00758 715/700 |
| 2002/0069218 | A1* | 6/2002 | Sull | G06T 3/4092 715/202 |

(Continued)

FOREIGN PATENT DOCUMENTS

WO WO2007066924 6/2007

OTHER PUBLICATIONS

International Search Report & Written Opinion dated Jan. 22, 2018 in International Patent Application No. PCT/US2017/054068.

(Continued)

*Primary Examiner* — Loc Tran
(74) *Attorney, Agent, or Firm* — Byrne Poh LLP

(57) ABSTRACT

A content system identifies shots in a first video and shots in a second video. Shot durations are determined for the identified shots of each video. A histogram is generated for each video, each histogram dividing the identified shots of the corresponding video into a set of buckets divided according to a range of shot durations. The system determines confidence weights for the buckets of each histogram, with the confidence weight for a bucket based on a likelihood of a particular number of identified shots occurring within the range of shot duration for that bucket. A correlation value is computed for the two videos based on a number of identified shots in each bucket of each respective histogram and based on the confidence weights. The content system determines whether the two videos are similar based on the correlation value and a self-correlation value of each video.

22 Claims, 6 Drawing Sheets

(56) References Cited

U.S. PATENT DOCUMENTS

| | | | |
|---|---|---|---|
| 2005/0183016 A1* | 8/2005 | Horiuchi | G06K 9/00711 |
| | | | 715/719 |
| 2006/0026628 A1* | 2/2006 | Wan | H04N 5/272 |
| | | | 725/32 |
| 2010/0007793 A1* | 1/2010 | Kapoor | H04N 5/147 |
| | | | 348/571 |
| 2011/0225196 A1* | 9/2011 | Haseyama | G06K 9/00744 |
| | | | 707/780 |
| 2018/0137367 A1* | 5/2018 | Pavetic | G06K 9/00744 |

OTHER PUBLICATIONS

Redfren, Nick, "Comparing the Shot Length Distributions of Motions Pictures Using Dominance Statistics", in Empirical Studies of the Arts, vol. 32, No. 2, Jul. 1, 2014, pp. 257-273.

* cited by examiner 510 confidence weights for Video A

| $C_{A1}$ | $C_{A2}$ | $C_{A3}$ | $C_{A4}$ | $C_{A5}$ | $C_{A6}$ | ... | $C_{AN}$ |
|---|---|---|---|---|---|---|---|

520 confidence weights for Video B

| $C_{B1}$ | $C_{B2}$ | $C_{B3}$ | $C_{B4}$ | $C_{B5}$ | $C_{B6}$ | ... | $C_{BN}$ |
|---|---|---|---|---|---|---|---|

530 Shot counts for Video A

| $S_{A1}$ | $S_{A2}$ | $S_{A3}$ | $S_{A4}$ | $S_{A5}$ | $S_{A6}$ | ... | $S_{AN}$ |
|---|---|---|---|---|---|---|---|

540 Shot counts for Video B

| $S_{B1}$ | $S_{B2}$ | $S_{B3}$ | $S_{B4}$ | $S_{B5}$ | $S_{B6}$ | ... | $S_{BN}$ |
|---|---|---|---|---|---|---|---|

550 Correlation of Video A and B with confidence weights:

$$\sum_{i=1}^{N} (S_{Ai}C_{Ai})(S_{Bi}C_{Bi}) = (S_{A1}C_{A1})(S_{B1}C_{B1}) + (S_{A2}C_{A2})(S_{B2}C_{B2}) + (S_{A3}C_{A3})(S_{B3}C_{B3}) + \ldots + (S_{AN}C_{AN})(S_{BN}C_{BN}) = Corr_{AB}$$

560 Self-Correlation of Video A with confidence weights:

$$\sum_{i=1}^{N} S_{Ai}S_{Ai}C_{Ai} = (S_{A1}S_{A1}C_{A1}) + (S_{A2}S_{A2}C_{A2}) + (S_{A3}S_{A3}C_{A3}) + \ldots + (S_{AN}S_{AN}C_{AN}) = Corr_{A}$$

570 Self-Correlation of Video B with confidence weights:

$$\sum_{i=1}^{N} S_{Bi}S_{Bi}C_{Bi} = (S_{B1}S_{B1}C_{B1}) + (S_{B2}S_{B2}C_{B2}) + (S_{B3}S_{B3}C_{B3}) + \ldots + (S_{BN}S_{BN}C_{BN}) = Corr_{B}$$

580 Comparison Value:

$$\frac{Corr_{AB}}{\sqrt{Corr_{A}Corr_{B}}}$$

FIG. 5

DETERMINATION OF SIMILARITY BETWEEN VIDEOS USING SHOT DURATION CORRELATION

TECHNICAL FIELD

The disclosed embodiments relate generally to computer-implemented methods for video processing, and more specifically, to determining similarity between videos using shot duration information.

BACKGROUND

A content system may receive a very large number of content items, such as videos, uploaded from users and other entities. These videos may comprise a variety of different types of content, such as movies and home videos, and may be significantly different in composition, lighting, and other aspects. Many of the videos that are uploaded may in fact be the same video, or be a similar version of the same video. This may present a problem for the content system, as it attempts to organize and categorize the videos, or present them for recommendation to users of the content system. If for example, the content system were to recommend two videos to a user that were actually the same video, the user experience is diminished, and user engagement of the content system may decrease. Thus, it is desirable for the content system to be able to detect the similarity between videos in the content system such that it is able to determine which videos may be duplicates or similar versions of other videos.

However, with the very large number of videos received by the content system, the content system needs an efficient method of determining the similarity between videos. Methods such as analyzing the content of each video in order to determine similarity may require processing power in excess of that which is available to perform such similarity comparison. Furthermore, the varied nature of the composition and content of the videos may cause inaccuracies when attempting to determine video similarity using video content. Thus, a better and more efficient method of determining similarity between videos is lacking and is desired.

SUMMARY

In one embodiment, a computer-implemented method for determining similarity in videos is described. The method comprises identifying a first plurality of shots in a first video and a second plurality of shots in a second video. The method further comprises determining shot durations for the identified shots of each video. A histogram for each video is generated, with each histogram dividing the plurality of identified shots of the corresponding video into a set of buckets divided according to a range of shot durations. Confidence weights for the buckets of each histogram are determined, with the confidence weight for a bucket based on a likelihood of a particular number of identified shots occurring within the range of shot durations for that bucket. A correlation value is computed for the two videos based on a number of identified shots in each bucket of each respective histogram and based on the confidence weights. A determination of similarity between the first video and the second video based on a comparison of the correlation value with a self-correlation value of each video is made.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 5 illustrates an exemplary process for the computation of the correlation value between the first video and the second video as well as the determination of a measure of similarity between the two videos, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. Overview

The content system described herein provides the advantage of efficiently determining the similarity between two (or more) videos. The content system determines and makes use of correlations in shot durations between videos to determine the similarity between them. By using this method, the content system is able to efficiently and quickly analyze the similarity between videos that are uploaded to the content system. Since the content system may receive many videos over a short period of time, e.g., millions of videos every day, the ability to quickly determine the similarity between videos is advantageous as the content system may not have sufficient processing power to perform a more rigorous similarity analysis using more computing power-intensive processes. This efficient process allows the content system to group similar videos together, e.g., so that only one of a set of similar videos may be recommended to a user, forwarded for further analysis and/or processing, and so on.

II. System Architecture

Figure 1:
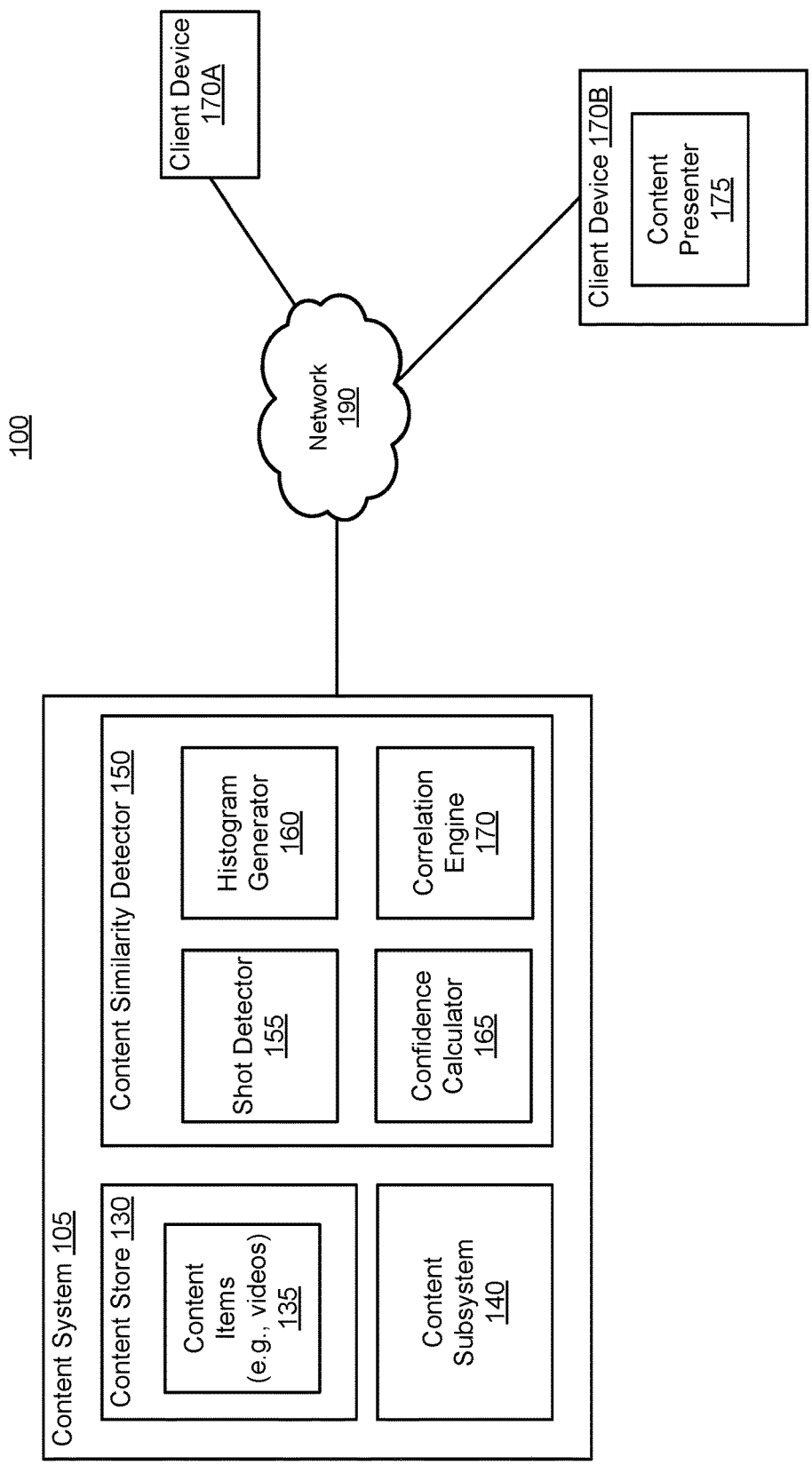
FIG. 1 is a high-level block diagram of an environment for determining similarity between videos using shot duration correlation, according to one embodiment.

FIG. 1 is a high-level block diagram of an environment 100 for determining similarity between videos using shot duration correlation, according to one embodiment. FIG. 1 illustrates a content system 105 with a content store 130, content subsystem 140, and a content similarity detector 150. The content system 105 is connected to the network 190, which is also connected to client devices 170. While certain elements are shown in FIG. 1, in other embodiments the environment may have different elements. Furthermore, the functionalities between elements may be distributed in a different manner in other embodiments, to different or multiple modules.

Client Device and Network

The client device 170 is a computing device that may access content from the content subsystem 140. A user of the client device 170 can access videos from the content subsystem 140 by using the client device 170 to browse a catalog of content, conduct searches using keywords, review play lists from other users or the system administrator (e.g., collections of content forming channels), or view content associated with particular user groups (e.g., communities). Additionally, in some embodiments, the client device 170 may also be used to upload content (e.g., videos) to the content system 105. The client device 170 may be a desktop, laptop, smart phone, tablet, wearable device, television, set top box, and the like. Although FIG. 1 illustrates only a single client device 120, it should be understood that many client devices (e.g., millions) can communicate with the content system 105 at any time.

In one embodiment, the client device 170 accesses content from the content system 105 and presents the content to the user via the content presenter 175. In one embodiment, the content presenter is accessed through a web browser includes a video player (e.g., an HTML5-compliant player). The content presenter 175 may be able to present to the user the content concurrently with captions or other metadata (e.g., annotations) received from the caption system 105. The content presenter 175 may be a web browser that allows the user to view web pages and content provided by the content subsystem 140.

In one embodiment, the client device 170 may upload content items to the content system 105 (e.g., via the content presenter 175). For example, client devices 170 may upload videos to the content system 105. In some cases, two or more client devices 170 may upload videos that are the same or very similar to the content system 105.

Network

The network 190 represents the communication pathways between the client device 170 and the content system 105. In one embodiment, the network 190 is the Internet, but may also be any network, including but not limited to a LAN, a MAN, a WAN, a mobile, wired or wireless network, a cloud computing network, a private network, or a virtual private network, and any combination thereof. In addition, all or some of links of the network 190 can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Content System

The content system 105 provides content items to users of the client devices 170 and also receives content uploaded from the client devices 170. The content system 105 includes a content store 130, a content subsystem 140, and a content similarity detector 150. The content system 105 may also include additional elements, subsystems, and servers, such as a load balancing sub-system, a content distribution network, and so on. These and other additional elements are excluded from the illustration in FIG. 1 in order to improve the ease of understanding. In addition, the functionality of each of the illustrated subsystems may be divided amongst more than one hardware device. For example, the functionality of the content subsystem 140 as described herein may be split across multiple individual servers.

Content Store

The content store 130 of the content system 105 stores content items 135. The content items 135 may include video and/or audio content items of various durations, resolutions, and so on. For example, a content item 135 may include a traditional video file in any number of aspect ratios, a 4K video file, a 360-degree video file, or a stereoscopic (e.g., 3D) video file. The content items 135 may be stored in a variety of formats such that they can be compatible with as many client devices 170 as possible. They may also be stored in a variety of bitrates, to accommodate different network bandwidth capacities. Each content item 135 that is stored in the content store 130 may also be stored with and associated with metadata, such as a title, description, responsive comments, ratings, captions, and so on.

Content Subsystem

The content subsystem 140 provides access to, viewing and listening of, and allows the uploading of the content items 135, e.g., videos (process not shown). The content subsystem 140 allows users to access the content items 135 in the content store 130 via searching and/or browsing interfaces. The content items 135 can be sourced from user uploads of content, from searches or crawls of other websites or databases of content, or the like, or any combination thereof. For example, in one embodiment the content subsystem 140 can be configured to allow for user uploads of content. The content subsystem 140 stores these uploaded content items in the content store 130. As another example, the content subsystem 140 may retrieve content from other content databases over the network 190.

The content subsystem 140 processes search queries received from a user. A search query may include search criteria, such as keywords that may identify videos the user is interested in viewing. The content subsystem 140 may use the search criteria, for example, to query the metadata of and/or entities associated with all the content items 135 stored in the content store 130. The search results from the query are transmitted by the content subsystem 140 to the client device 170.

The content subsystem 140 may receive content from client devices 170 (process not shown). The processing of the received content may include assigning an identification number to the newly received content. Other steps of processing the received content may include formatting (e.g., transcoding), compressing, metadata tagging, content analysis, and/or other data processing methods.

The content may also be associated with other information, such as title, description, content type, author, ratings, and so on. The content subsystem 140 stores the content (and any associated metadata) in the content store 130.

The content subsystem 140 may serve content in a similar fashion to the YouTube™ website; other video hosting websites are known as well, and can be adapted to operate according to the teaching disclosed herein.

Content Similarity Detector

The content similarity detector 150 determines the similarity between video content items by correlating information regarding the durations of shots (shot duration) between videos. As noted previously, the content system 105 may receive a large number of videos over a small period of time. Many of these videos may actually be the same or be very similar to each other. However, these similar videos may not have the same file size, byte sequence, checksum or other file format characteristics. For example, some videos may be different cuts or editions of the same film (e.g., due to regional restrictions), or have different encodings, compression formats, video formats, resolutions. Thus, the content system 105 may not be able to simply compare the videos using basic encoding, compression format, video format, or resolution information to distinguish or identify the videos as similar. Further, performing a byte sequence, hash, or other method directly using the binary values of the files may also not yield adequate results for identifying the videos as similar.

Instead, the content system 105 may analyze, to a certain extent, the content of each video to determine whether it is similar to another video. However, as the content system 105 receives a very large number of videos in a short span of time (e.g., 300,000 videos every day), the content system 105 needs an efficient but accurate method of determining the similarity between two videos.

To achieve this goal of determining a similarity between a first video and a second video in a processing-efficient manner, in one embodiment, the content similarity detector 150 as briefly introduced above, identifies and makes use of correlations between the number of shots (shot count) of different durations within a first and a second video being compared. As described in further detail below, the content similarity detector 150 includes a number of elements including a shot detector 155, a histogram generator 160, a confidence calculator 165, and a correlation engine 170. Although the above-listed example elements are shown here for the content similarity detector 150, in other embodiments, the functions of each element may be distributed differently among various hardware and/or software components.

Content Similarity Detector—Shot Detector

The shot detector 155 identifies shots in a video as well the duration of these shots. In order to do this, the shot detector 155 determines the shot boundaries, also known as the shot transitions, of the video. A shot is a series of consecutive and interrelated frames in a video, typically taken by a single camera, and typically representing a continuous action in time and space. The transitions between two shots in a video may generally be abrupt transitions (i.e., sudden or immediate) or more gradual transitions (i.e., transitions over relatively few frames). The shot detector 155 may utilize multiple methods to determine the boundary between shots in the video.

For example, to identify a shot the shot detector 155 may first determine a score (e.g., an inter-frame score) for two frames in a video. These two frames may be consecutive frames in a video, or near-consecutive frames in the video (e.g., frames separated by a small number of intervening frames, such as 5 frames). The shot detector 155 determines whether a shot boundary exists between the two frames in the video based on the score. The shot detector 155 performs this operation repeatedly over different pairs of frames over the entire video to determine the set of shot boundaries (if any) that exist in the video.

To determine the score between two frames, the shot detector 155 may compute any one or more of a number of different quantities, examples of which include: 1) the sum of the differences between the pixel intensity values (e.g., of every pixel or only a subset of pixels) of the two frames, 2) the differences between the histograms of the two frames, or 3) the differences within edge detected versions of each frame (e.g., by using an edge detection convolution matrix). In addition, as some shot transitions occur over a number of frames, the shot detector 155 may determine the score for multiple frames or frame pairs at once. The shot detector 155 may consider sets of multiple frames at once, and compute the differences between pixel values in each frame pair, or the differences in the position and/or pixel value of edges between each frame compared to the other frames in the set. The shot detector 155 may determine the overall variance or standard deviation of the differences within the frames of the set, and the score may be computed as this variance value, or may be based on the variance value. The shot detector 155 may also overlap each set when computing the scores for each set.

After determining a score, the shot detector 155 may determine, based on a score between two frames, whether a shot boundary exists at the point indicated by the two frames in the video. The shot detector 155 may set a threshold such that any score exceeding the threshold indicates a shot boundary. This threshold may be adaptive based on the characteristics of the video. For example, thresholds may be calibrated using a sample of similar videos having the same genre, format, or other similar characteristic, and these different thresholds may be used depending upon the video being analyzed. The shot detector 155 may also use machine learning techniques, by training a machine learning model (e.g., a deep neural network) using a ground truth of training videos with output labels indicating where shot boundaries occur, and with input labels being the scores computed for each pair of frames.

These methods described above may also be utilized individually or in combination. For example, the fastest method (e.g., determining the differences in pixel values) may be utilized first to determine potential candidate shots, and subsequently a more accurate method (e.g., determining the difference in histograms) may be utilized to narrow down the resulting set of "identified" shots. As another example, the shot detector 155 may also pass the score through a simple threshold test but also pass the score through a machine learning model if the score is within a certain range of the threshold value to verify the results.

If the shot detector 155 determines that a score indicates a shot boundary, it may mark the frame position corresponding to the score as a shot boundary location. If the score was based on a pair of frames, then the shot detector 155 may mark the first or the second frame as a location of a shot boundary. If the score was determined from a set of frames, the shot detector 155 may mark the center frame of the set as the location of the shot boundary. If the shot detector 155 determines that multiple consecutive scores beyond a threshold number of scores indicate shot boundaries, the shot detector 155 may only indicate that the center frame in the multiple frames corresponding to the multiple consecutive scores is a location of a shot boundary.

Once the shot detector 155 determines the locations of the shot boundaries for the first video involved in the similarity determination, the shot detector 155 also, similarly, determines the presence and frame locations of the shot boundaries in the second video involved in the similarity determination. The shot detector 155 may also determine the duration of each shot, which may be stored as a number of frames between shot boundaries or some other measure of time (e.g., seconds). The shot detector 155 may determine the duration of each shot by determining the difference in the number of frames between one shot boundary and the next one, and/or by converting or calculating this value into/in a measure of time (or time difference).

In some cases, the first and second videos may be of different frame rates (e.g., different fps or frames per second). For example, the first video may be 30 fps and the second video 25 fps. In such a case, if the shot durations are measured by the shot detector 155 using number of frames, a shot in the first video, even if it were same (or similar) to a shot in the second video, may have a large difference of number of frames to the shot in the second video, and hence a large difference in shot duration as measured by number of frames. In such a case, the shot detector 155 first converts the two videos to each have the same fps or frame rate. The shot detector 155 may convert one video to the frame rate of the other video, or may choose a new frame rate that is wholly divisible by the frame rates of each video, or that can wholly divide into the frame rates of the two videos ("wholly" as used here indicates that a whole number results from the division). The shot detector 155 may convert the two videos into a frame rate matching the frame rate of a sample set of videos used to compute a confidence weight as described below. The shot detector 155 converts each video to the newly chosen frame rate and performs the shot detection as described above.

Content Similarity Detector—Histogram Generator

The histogram generator 160 generates a histogram for each of the first and second videos, with the buckets of the histogram grouping each video by shot duration. The histogram generator 160 takes the shot durations for the first video as generated by the shot detector 155 and separates the shots into different buckets of a first histogram according to shot duration. Each bucket may include the shots having a specific duration or shot duration range (i.e., range of durations). The shot durations, shot duration ranges, and/or number of buckets specified for the first histogram may be the same for all histograms generated by the histogram generator 160. The first histogram may thus include multiple buckets, each bucket indicating a number of shots (shot count) for the video of shots within a certain shot duration range or with a specified shot duration. The histogram generator 160 also generates a similar second histogram for the second video. Both of these histograms may include the same number of buckets, with the buckets of each histogram specifying the same shot durations. Additional details regarding the generation of the histograms is described below with reference to FIG. 2.

Content Similarity Detector—Confidence Calculator

The histograms of the first video and the second video may be directly compared to determine a similarity between the two videos. However, instead of directly comparing the shot counts in each histogram of the first and second videos directly, the confidence calculator 165 first computes a confidence weight for the buckets of each histogram. Each confidence weight indicates the probability of a particular shot count occurring in a particular bucket. The confidence weight is used to modify (e.g., by normalizing) the shot count value in each bucket before comparing the corresponding shot count values of each video when making the similarity comparison.

The reason for computing the confidence weight is that certain shot counts for certain bucket durations are more common than others, and should be weighted less than those shot counts for certain bucket durations that are less common. For example, it may be very common for videos to have around 20 shots of 10 second duration (e.g., 300 frames at 30 fps), and thus if the histogram indicates that one of the videos (the first or second) has 20 shots in a bucket that includes shots of 10 second duration, the shot count of that bucket may be weighted less than other less commonly occurring shot counts. This helps focus the similarity calculation on those buckets of shot durations having out-of-normal shot counts, which helps identify two videos that would otherwise appear to be similar according to other similarity calculations.

To determine the confidence weights for the first histogram, the confidence calculator 165 may first determine, over a large number of sample videos, the average shot count in those videos for shots of different durations (or shot duration ranges) corresponding to the durations specified in the buckets of the first histogram. These average values are used to determine the Poisson distribution for shot counts of those durations. After determining the Poisson distribution for different average shot counts, the confidence calculator 165 computes, using the computed Poisson distributions, for every bucket of the first histogram, the Poisson probability of having the shot count indicated in that bucket, for the duration (or shot duration ranges) indicated for the bucket.

Thus, summarizing the last paragraph, the confidence calculator 165 may base the confidence weight for each bucket of the first histogram on the computed Poisson probability for that bucket. In particular, the relationship between the computed value of the confidence weight for a bucket and the Poisson probability for that bucket may in some cases be an inverse relationship, i.e., as the Poisson probability value goes down, the confidence weight value goes up, and vice versa. This is because as the probability increases, this indicates that the particular shot count corresponding to the probability is more common, and thus it is weighted less, and thus the confidence weight is lower. For example, using the example from above, if the shot count of the bucket including shots of 10 second durations is 18, the Poisson probability of this shot count may be high (e.g., close to 100%) and thus the confidence weight for this bucket is computed to be low by the confidence calculator 165.

Although the exact relationship between the confidence weight and the corresponding Poisson probability may be an inverse relationship, the relationship may be more complicated than this. In some cases, the relationship may vary exponentially with the Poisson probability, such that the confidence weight may decrease exponentially in relation to the Poisson probability, with the decrease in the confidence weight tapering off as the Poisson probability decreases. Generally, the exact relationship varies by implementation and may use any function.

The confidence calculator 165 repeats the same process described above for the second histogram. Additional details regarding the computation of the confidence weights are described below with regards to FIGS. 3-4.

Content Similarity Detector—Correlation Engine

The correlation engine 170 determines a correlation value between the first and second videos using their respective histograms and associated confidence weights. The correlation engine 170 also computes self-correlation values of each video, and may determine the measure of similarity between the two videos using the correlation value and self-correlation values.

To determine the correlation value, the correlation engine 170 computes the correlation of the shot count values of the first video with the shot count values of the second value, modified by the corresponding confidence weights.

In one embodiment, the correlation engine 170 may compute the correlation value by multiplying the shot count of every bucket of the first histogram with the corresponding confidence weight for that bucket (as computed by the confidence calculator 165) for each of the first and second histograms. These are referred to as the confidence weight weighted shot counts. These two sets of confidence weight weighted shot counts are multiplied together as a dot (inner) product to produce the correlation value between the first and the second videos.

The correlation engine 170 also computes the self-correlation value for the first histogram and the second histogram. These may also be weighted by the respective confidence weights of the buckets of each histogram. The correlation engine 170 may combine these two self-correlation value into a combined self-correlation value (e.g., by taking the square root of the product of the self-correlation values).

The correlation engine 170 compares the correlation value with the combined self-correlation value. If the two values are similar (e.g., the ratio between the two numbers is larger than a threshold), the correlation engine 170 may determine that the two videos being compared are similar. Otherwise, the correlation engine 170 may determine that the two videos are dissimilar. Additional details regarding the computation of the correlation values and the determination of similarity are described below with regards to FIG. 5.

Note that although the system is primarily described here with regards to a first and second video, the content similarity detector 150 may be able to determine the similarity between more than two videos as well. The content similarity detector 150 may compare each video in a set of videos with every other video in that set and may determine that the videos in the set are similar if the correlation values computed for each video with the other videos in the set are similar.

Using the system described here, a content system may be able to quickly determine any similarities of a large number of videos that are received by the content system. Instead of analyzing each video according to other, more computing-intensive analyses of the substantive content of each video, the content system is able to determine similarity using the faster but still accurate method described here. One reason the method described here is accurate is that it accounts for how common a certain shot count is in a video, and weighs such common shot counts less heavily in the determination of similarity between two videos.

This is particularly useful for distinguishing videos that would otherwise appear identical according to other types of computational analyses of video content. For example, sports matches such as soccer games are often filmed from a perspective view looking down at a field. As such, the majority of the content of these videos are filled with relatively uniform green fields, and uniformed players in various colors moving, to an untrained computer algorithm, in a somewhat random fashion across the field. As such, all games including one team, or the two same teams might appear identical according to other algorithms, even though the actual game depicted may be different in each unique video. The process described herein is able to disambiguate these otherwise similar videos by looking at shot counts and durations which, even for sports matches between similar teams, generally will differ enough between videos to disambiguate the videos.

III. Exemplary Shot Duration Histogram

Figure 2:
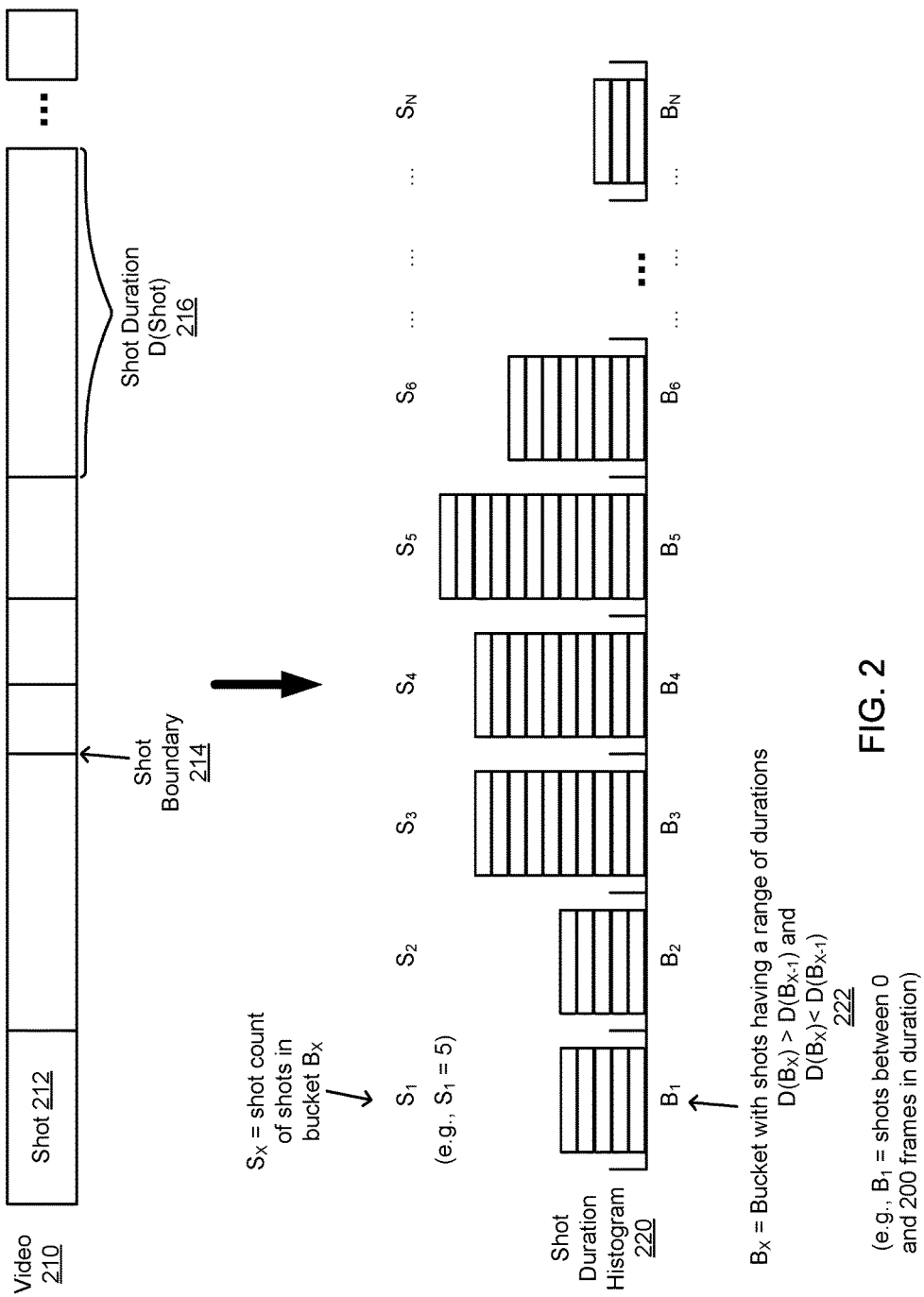
FIG. 2 is a diagram illustrating an exemplary method of converting a video into a shot duration histogram, according to one embodiment.

FIG. 2 is a diagram illustrating an exemplary method of converting a video 210 into a shot duration histogram 220, e.g., as performed by the shot detector 155 and histogram generator 160 as described above, according to one embodiment. Although a particular process with specific values and combinations of variables are shown here, they are provided for illustrative purposes only.

A video 210 includes many different shots 212. Each shot is separated from a neighboring shot by a shot boundary 214. For example, the shot boundary 214 could be an abrupt transition, such as a direct cut, or it may be a gradual transition, such as a fade, wipe, or other transition effect. Furthermore, each shot, as described above, has a shot duration 216 (denoted as D in the figure).

Using the methods described above, such as determining a score for two frames and determining whether that score indicates a shot boundary 214, the shot detector 155 identifies shots 212 and shot boundaries 214 in the video 210 and also determines the shot durations 216 for these shots in accordance with the method described above. The histogram generator 160 takes the information about the shots and shot boundaries and generates a shot duration histogram 220 for the video 210. This shot duration histogram 220 includes multiple buckets. Each bucket $B_X$ includes shots with a shot duration within certain range. This range may be exactly a single value (e.g., a shot duration of 300 frames exactly) or may be a range of values from a lower value to a higher value (e.g., 300-500 frames). The ranges covered in each bucket may be equal or may be different. The shot duration range of one bucket may also be consecutive with the shot duration range of adjacent buckets (i.e., no gaps exist). The histogram generator 160 puts each shot in the video in a corresponding bucket such that the shot duration of that shot matches the shot duration range of the bucket. The buckets in the shot duration histogram 220 are arranged in FIG. 2 such that each bucket has an increasing shot duration range from left to right. Thus, as shown at 222 in FIG. 2, a bucket $B_X$ has a shot duration range $D(B_X)$ that is greater than the shot duration range $D(B_{X-1})$ but less than $D(B_{X+1})$.

The shot duration range covered in each bucket may be determined based on an analysis of a set of sample or training videos in the content store 130. In one case, the histogram generator 160 may determine the ranges of shot durations such that a certain percentage of shots in the entire set of sample videos is assigned to each bucket. For example, the histogram generator 160 may add (i.e., assign) shots from the sample set of videos into a first bucket until it reaches 1% of the total shots in the sample set of videos. This results in a range of shot durations in the first bucket from zero to a first shot duration. Subsequent buckets may be filled in the same fashion (e.g., up to 1% of all shots), with its range being the longest shot duration of the previous bucket, to the longest shot duration of the current bucket. For example, the second bucket would include shots with shot durations greater than the first shot duration and up to a second shot duration. In another case, the shot duration range of each bucket may be fixed to an equal shot duration range for every bucket. This range may be determined such that a total number of buckets needed to contain the shots for the entire sample size of videos does not exceed a certain value (e.g., 100 buckets). Thus, for example, if the longest shot in the sample size of videos is 10000 frames, then the system may have a range of 100 frames for each bucket if the limit on the number of buckets is 100.

In some cases, a shot may fall outside the shot duration range of any of the buckets determined by the histogram generator 160 using the sample set of videos. Thus, an additional overflow bucket may be included that has a specified shot duration range including shots greater than the largest shot duration in the set of buckets and a shot duration of infinity. Alternatively, any shots larger than the largest shot duration may be discarded and not placed in any bucket of the histogram.

The histogram generator 160 also generates a second histograms for the second video, with the buckets in the second histogram having the same configuration as the histogram for the first video, i.e., with each bucket of the second histogram having the same shot duration ranges as the buckets of the first histogram.

IV. Exemplary Probability Distribution to Compute Confidence Weights

Figure 3:
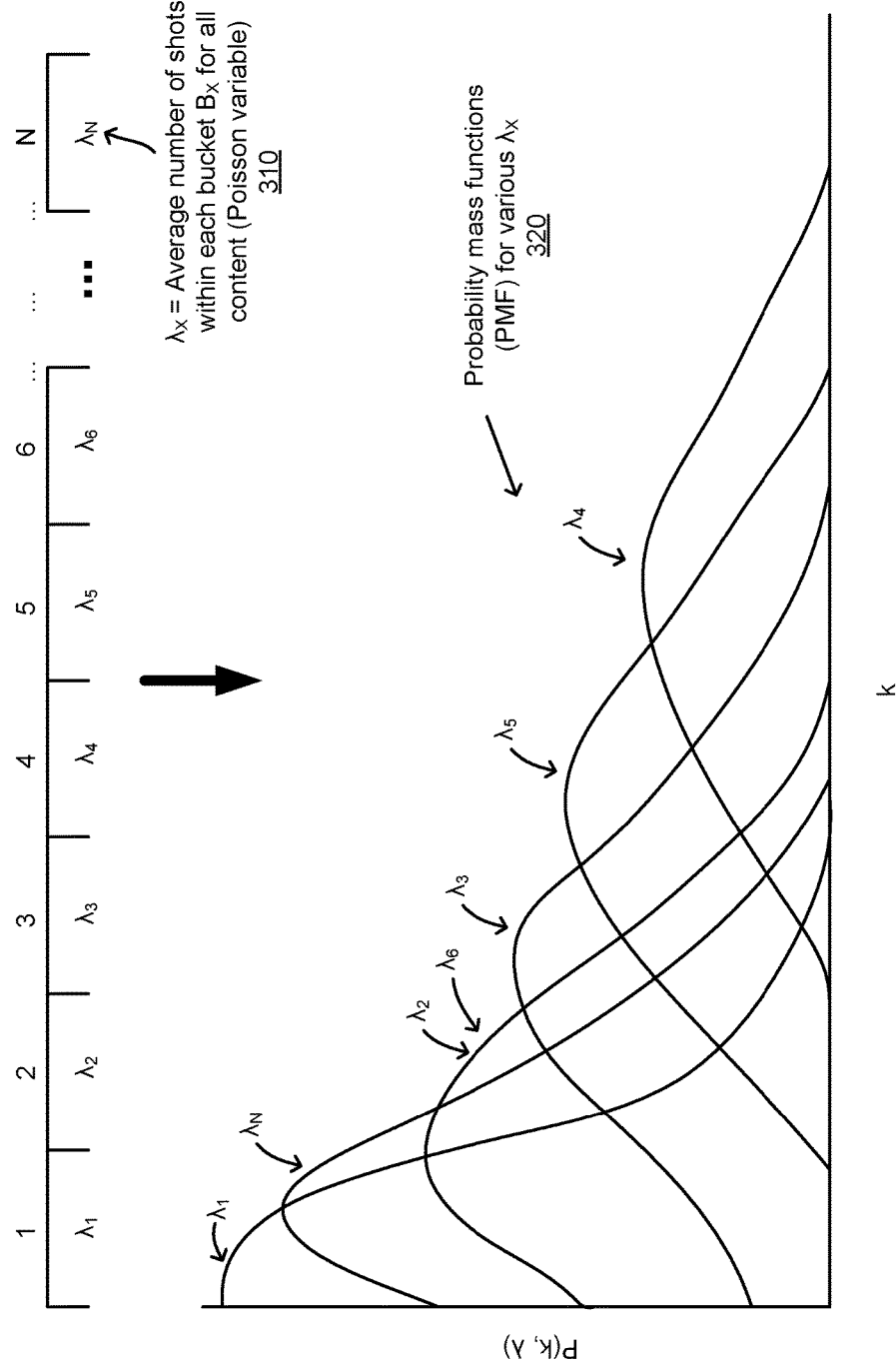
FIG. 3 illustrates an exemplary process for the generation of the Poisson probability mass functions based on the average shot count of shots within certain shot duration ranges, according to one embodiment.

FIG. 3 illustrates an exemplary process for the generation of the Poisson probability mass functions based on the average shot count of shots within certain shot duration ranges, according to one embodiment. The process illustrated in FIG. 3 may be executed by the confidence calculator 165 of the content system 105 as described above with regards to FIG. 1.

The confidence calculator 165 initially determines the average shot count for different ranges of durations among a set of sample/training videos, which may correspond to the entire set of videos in the content store 130. The ranges of durations that the confidence calculator 165 considers correspond to the same ranges of durations of the buckets of the histograms that are generated by the histogram generator 160. Thus, if the histogram generator generates buckets that have ranges of durations that increment by 1000 frame intervals, the confidence calculator 165 computes the shot count for shots within each 1000 frame interval for each video in the sample, and determines the average of these shot counts.

The average is the average shot count for the videos in the sample set of videos, for the particular shot duration range. When computing this average shot count, the confidence calculator 165 may set as zero those videos in the sample set that do not have any shots within the particular shot duration range. To determine the shot counts for each video in the sample set, the confidence calculator 165 may request that the shot detector 155 and histogram generator 160 determine the shot boundaries and shot counts as described above. The confidence calculator 165 may also round the result to the nearest non-negative integer value in some cases, as the computation may be a discrete computation.

As an example of such a process, for a shot duration range of 1000-2000 frames for a certain bucket $B_X$, the confidence calculator 165 has received data indicating that each video of the sample set of videos has, for this shot duration range, shot counts of 0, 5, 0, 10, 10, 32, 50, and 25. In this case, the average of these individual shot counts is 16.5, which may be rounded up to 17. This means that for the shot duration range of 1000-2000 frames, the average shot count of the sample set of videos is 16.5 (or 17 if rounded). Note that although only 8 videos are used for the sample set in this example, in practice the sample set of videos may be much larger and include millions of videos. Note also that although the shot duration range includes a range of frames, the shot duration range may include only a single duration, e.g., 1000 frames, rather than a range.

Once the confidence calculator 165 determines the average shot count for a shot duration range, the confidence calculator 165 may compute the Poisson distribution for that shot duration range. The average shot count is the lambda ($\lambda$) value for the Poisson distribution for the particular shot duration range. For example, if the average shot count for the shot duration range of 1000-2000 frames is 16.5, then the lambda value for this shot duration range is 16.5. The Poisson distribution is a discrete probability distribution that expresses the probability of a given number of events occurring in a fixed interval, if a known average is known for these events, and if the events occur independently of each other. Here, the events are the shot counts in a shot duration range and the intervals are the videos, i.e., here the Poisson distribution is determining the probability of a certain shot count in a shot duration range occurring in a video.

As shown in FIG. 3, each bucket $B_X$ has a certain average shot count, which is used as the lambda values 310 of the Poisson distribution, i.e., the average shot count of bucket $B_X$ is $\lambda_X$. The confidence calculator 165 determines the Poisson probability for each shot count for a particular lambda value using the Poisson probability equation:

$$P(k \text{ shots}) = \frac{\lambda^k e^{-\lambda}}{k!} \quad (1)$$

Where k is a shot count of a shot duration range (represented by a bucket $B_X$), and lambda ($\lambda$), as described above, is the average shot count for the same shot duration range. For example, using the above example of a lambda value of 16.5, a shot count of 10 would result in a computed probability of $((16.5^{10}) (e^{-16.5}))/10!$ or approx. 0.0281. In other words, there is about a 2.8% chance that a shot count of 10 would occur for an average shot count of 16.5.

The confidence calculator 165 may determine the different Poisson probability mass functions (PMFs) 320, i.e., the Poisson distributions, using these lambda values and the equation (1) above. The Poisson PMF, as shown in FIG. 3, plots the k (shot count) against the Poisson probability for a particular lambda value $\lambda$, using the Poisson probability function as shown in equation (1). As shown, the Poisson probability in each Poisson distribution has a maximum point (which may occur where k is near the respective lambda value for the distribution) and tapers outside of this point. The maximum point is a point of highest probability, and thus a shot count k at that point would be most likely to occur for an average shot count $\lambda_X$. As shown in FIG. 3, some of the average shot counts may be the same, and thus the Poisson PMF for these average shot counts are also the same (e.g., see $\lambda_2$ and $\lambda_6$ in FIG. 3). Using these Poisson distributions, the confidence calculator 165 computes the confidence weights as described below with reference to FIG. 4.

Note that in one embodiment, the sample set of videos may include a subset of all the videos in the content store 130. The confidence calculator 165 may compute different average shot counts for the same shot duration ranges for these different subsets. These different subsets may divide the videos in the content store 130 into certain groups based on the characteristics of those videos. For example, the divisions may be based on video type (e.g., 3D, 360 degree), length, genre, resolution, tags, author, channel that the video belongs to, comment history, view count, and so on.

In one embodiment, to generate a subset of the videos for use as the sample set, the confidence calculator 165 stores a ranked list of those characteristics described above. The characteristics may be ranked such that characteristics that are shared by similar videos are ranked higher. The confidence calculator 165 identifies the characteristic of the video under analysis that is ranked highest in the list and which has a matching subset of videos with computed average shot counts. The confidence calculator 165 uses the computed average shot counts from this matching subset of videos for the computation of the PMFs (probability mass functions) for the video under analysis.

In another embodiment, the confidence calculator 165 uses as the sample set of videos the two videos that are being analyzed for similarity. Although a smaller sample size is used here, this analysis means that the confidence calculator 165 need not store a large amount of average shot count data, or pre-compute the average shot counts.

Although the above description is made with reference to the use of a Poisson distribution, in other embodiments the confidence calculator 165 uses other probability distribution functions to determine average shot counts (e.g., the normal distribution).

V. Exemplary Computation of Confidence Weights

Figure 4:
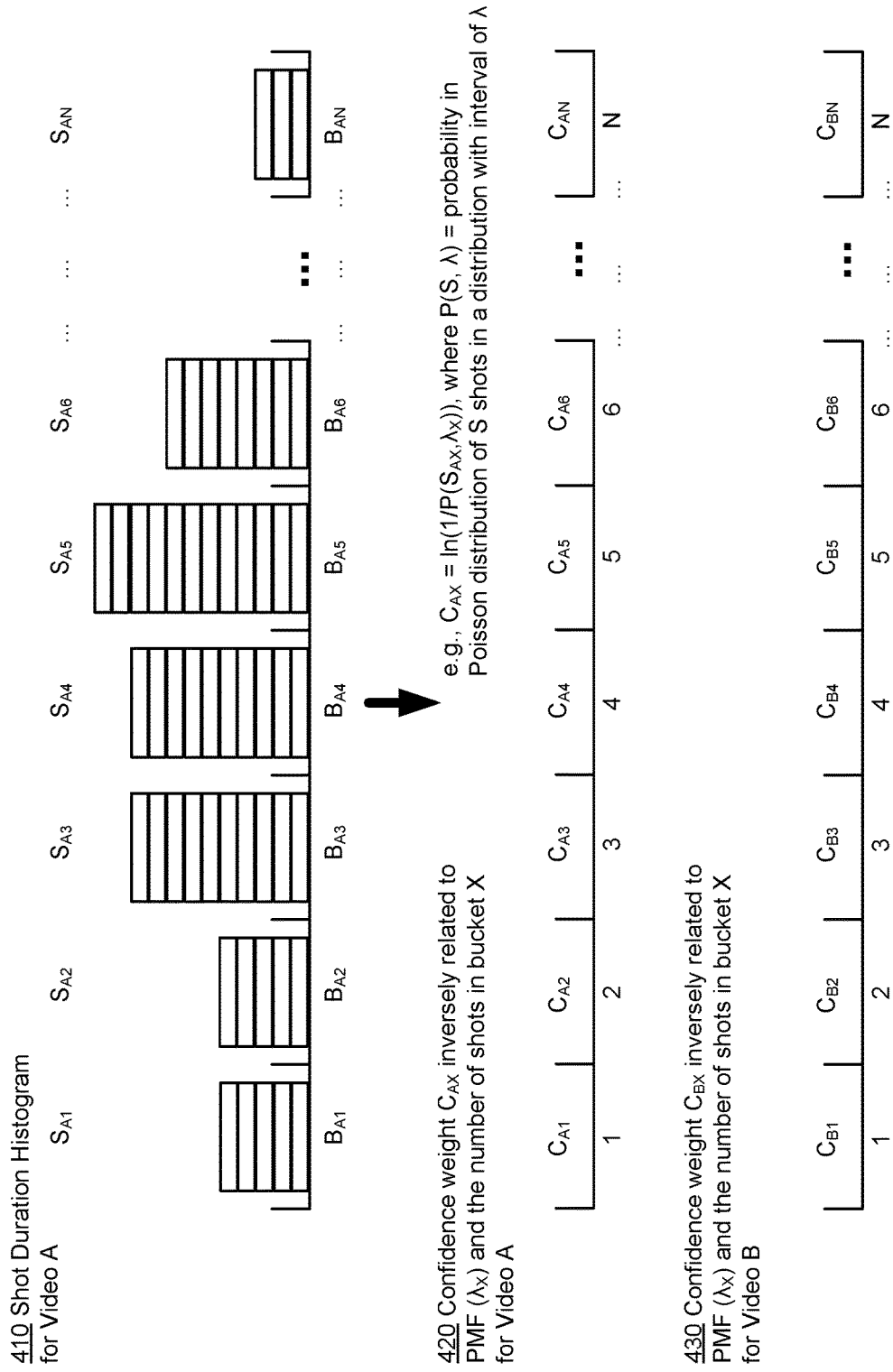
FIG. 4 illustrates an exemplary process for determining confidence weights for a histogram of a video based on a Poisson distribution of average shot counts, according to one embodiment.

FIG. 4 illustrates an exemplary process for determining confidence weights for a histogram of a video based on a Poisson distribution of average shot counts, according to one embodiment. The process described in FIG. 4 may be executed by the confidence calculator 165.

Once the confidence calculator 165 determines the Poisson probability as described above with reference to FIG. 3, the confidence calculator 165 determines the confidence weights for each bucket of the first histogram for the first video. The confidence calculator 165 also determines the confidence weights for the second histogram for the second video in a similar fashion.

As noted previously, for every shot duration range, some shot counts are more common than others. For example, more videos may have on average 10 shots in the shot duration range of 1000-2000 frames. If the shot count of a video for shots in this shot duration range is near the average count, then that shot count may not necessarily be a good marker for identifying the video as it is more common among videos. In other words, since that shot count appears very often among all videos in the sample set of videos, it is not necessarily unique enough to use as a marker for that video, and should be weighed less. On the other hand, a shot count that is far from the average may be weighted higher.

When analyzing the first histogram, the confidence calculator 165 determines confidence weights for the buckets of the first histogram. Referring to FIG. 4, for a bucket ($B_{AX}$) of the first histogram as shown in the shot duration histogram 410, the confidence calculator 165 determines the probability of the shot count of that bucket ($S_{AX}$) of the first video. This may be based on the Poisson distribution of the shot duration range for that bucket as determined by the confidence calculator 165 in the process described above for FIG. 3. The confidence calculator 165 determines the confidence weight ($C_{AX}$) of that buckets (shown at 420) such that the confidence weight increases as the probability decreases.

The relationship between the confidence weight for a bucket and the Poisson probability for the bucket may be the natural logarithm of the inverse of the probability, such that:

$$C_{AX} = \ln \frac{1}{P(S_{AX}, \lambda_X)} \quad (2)$$

Where $C_{AX}$ is the confidence weight, ln is the natural logarithm, and $P(S_{AX}, \lambda_X)$ is the Poisson probability of shot count S for a bucket X given the average shot count $\lambda_X$ for that bucket X. The purpose of using a logarithm is so that two weight values do not necessarily diverge very significantly from each other in range. If some confidence weights were much larger than others, the subsequent computations may be inaccurately skewed by the large confidence weight value.

In another embodiment, the relationship between the confidence weight and the Poisson probability may be based on some other relationship, such as a linear inverse relationship, exponential relationship, or may be based on some other function.

The relationship may also be determined using machine learning methods. For example, a training set of videos with known output labels may be fed into a model. The output labels indicate for two videos whether they are similar or not. The model may determine the relationship between the confidence weights and Poisson probability for each shot duration range that optimizes the prediction of similarity between two videos. As will be described below, the confidence weights are used to generate correlation values which can be used to determine the measure of similarity between the first and second videos.

As an example of the above process, say that the Poisson probability $P(S_{A1}, \lambda_1)$ of a shot count $S_{A1}$ is 0.55. If the relationship between the confidence weights and the Poisson probabilities is a linear inverse relationship, then $C_{A1}=\ln(1/P(S_{A1},\lambda_1))=\ln(1/0.55)$, which is approx. 0.59. Thus, the confidence weight for $S_{A1}$ is 0.59. Notice that the confidence weight increases as the Poisson probability decreases.

In one embodiment, in addition to computing the confidence weights for the first histogram, the confidence calculator 165 also computes the confidence weights $C_{BX}$ for the second histogram of the second video in a similar manner as shown at 430 in FIG. 4. For example, $C_{BX}$ may be calculated as $C_{BX}=\ln(1/P(S_{BX},\lambda_X))$.

Although the description here is in regards to computing a confidence weight for each bucket, in one embodiment, the confidence calculator 165 computes the confidence weight for a range of buckets (i.e., more than one bucket). To do this, the confidence calculator 165 may only compute the Poisson distribution for one bucket in a range of buckets, or use an average shot count value over the range of buckets in the sample set of videos. The confidence calculator 165 computes the same Poisson distribution for the range of buckets, and computes the same confidence weight for this range of buckets based on the shot count of the first bucket in this range or an average shot count value of the range of buckets.

VI. Exemplary Computation of Correlation and Similarity

FIG. 5 illustrates an exemplary process for the computation of the correlation value between the first video and the second video as well as the determination of a measure of similarity between the two videos, according to one embodiment. In one embodiment, the process may be performed by the correlation engine 170.

The correlation engine 170 accesses the confidence weights 510 for the first video, which is referred to here as Video A and the confidence weights 520 for the second video, which is referred to here as Video B. Note that in FIG. 5, a subscript marker of A refers to the first video, and a subscript marker of B refers to the second video. As described previously, these weights are computed based on the rarity of the occurrence of the corresponding shot count. Additionally, the correlation engine 170 accesses the shot counts 530 for the first video and the shot counts 540 for the second video. As described previously, the shot counts of a video indicate the number of shots in different buckets of a histogram for that video.

In one embodiment, the correlation engine 170 computes a correlation value 550 of the first video and the second video according to the function shown in FIG. 5 (at 550). In general, the correlation engine 170 may compute an inner product (or dot product) between the shot counts for the first video and the second video, as modified by the confidence weights for each video, respectively. Thus, for example, the first term in the function may be $(S_{A1}C_{A1})(S_{B1}C_{B1})$, which corresponds to the product of the shot count of the first bucket of the first video multiplied by the corresponding confidence weight of the first video, and the shot count of the first bucket of the second video multiplied by the corresponding confidence weight of the second video. This is summed with the same product for the second bucket, and so on, i.e., $$\text{Corr}_{AB} = \sum_{i=1}^{N} (S_{Ai}C_{Ai})(S_{Bi}C_{Bi}) \tag{3}$$

Although two confidence weights are used in the above equation (2), one for the first video and one for the second video, in an alternate embodiment the correlation engine 170 only computes the confidence weight for one of the videos (e.g., only $C_{AX}$ values are computed), and only modifies each component in the inner product by the single confidence weight instead of the two confidence weights as shown in FIG. 5. In other words:

$$\text{Corr}_{AB} = \sum_{i=1}^{N} (S_{Ai}C_{Ai})(S_{Bi}C_{Ai}) \tag{4}$$

The correlation engine 170 also computes the self-correlation 560 for the first video and the self-correlation 570 for the second video. As shown in FIG. 5, the self-correlation of a video is computed based on an inner product of the shot count of the video and itself (i.e., the shot count again), modified by the corresponding confidence weight. Thus, the self-correlation 560 of the first video (A) is:

$$\sum_{i=1}^{N} S_{Ai}S_{Ai}C_{Ai} \tag{5}$$

And the self-correlation 570 of the second video (B) is:

$$\sum_{i=1}^{N} S_{Bi}S_{Bi}C_{Bi} \tag{6}$$

In one embodiment, when only the confidence weights for one video are computed, both videos use the same confidence weight values for each bucket. For example, if only $C_{AX}$ were computed, the self-correlation of the second video (B) would instead be:

$$\sum_{i=1}^{N} S_{Bi}S_{Bi}C_{Ai} \tag{7}$$

After computing the correlation and self-correlation values, the correlation engine 170 determines a comparison value 580 that compares a first function of the self-correlation values 560 and 570 of the two videos with a second function of the correlation value 550 of both videos. For example, the first function could be a square root of the product of the two self-correlation values, and the second function could be a direct equivalence such that the correlation value 550 is not modified by the second function. The comparison value 580 may be computed based on an operation on the first function and the second function, such as a division, as illustrated in FIG. 5. Thus, the comparison equation used to compute the comparison value 580 may be:

$$\frac{\text{Corr}_{AB}}{\sqrt{\text{Corr}_A \text{Corr}_B}} \tag{8}$$

In equation (8), if the first video and the second video are similar, the computed comparison value 580 is close to 1, or 100%, otherwise, the comparison value 580 is lower. If the comparison value 580 is large (e.g., exceeding a threshold value such as 50%), the correlation engine 170 determines that the first and second video are similar to each other. The large comparison value 580 may indicate that the two videos (A and B) both have similar but rare combinations of shot counts.

Otherwise, if the comparison value 580 is small (below a threshold value), the correlation engine 170 may determine that the two videos are dissimilar. A small comparison value likely indicates that the two videos have dissimilar combinations of shot counts, or have similar but common combinations of shot counts.

In one embodiment, instead of determining either similarity or dissimilarity, the correlation engine 170 determines a variable, numerical measure of similarity (that varies over a range) based on the comparison 580. For example, if the difference indicated in the comparison 580 is large, the numerical measure of similarity may be low, and vice versa.

As an example of the correlation computation, assuming a comparison threshold value of 50%, imagine two sequences of shot counts. The sequence of shot counts for a first video A is $S_{A1}$: 2; $S_{A2}$: 0; $S_{A3}$: 1; $S_{A4}$: 0; $S_{A5}$: 1; $S_{A6}$: 1; $S_{A7}$: 1; $S_{A8}$: 0; $S_{A9}$: 1; $S_{A10}$: 1; $S_{A11}$: 0; $S_{A12}$: 1; $S_{A13}$: 0; $S_{A14}$: 1. The sequence of shot counts for a second video B is: $S_{B1}$: 2; $S_{B2}$: 1; $S_{B3}$: 0; $S_{B4}$: 1; $S_{B5}$: 0; $S_{B6}$: 0; $S_{B7}$: 0; $S_{B8}$: 1; $S_{B9}$: 1; $S_{B10}$: 1; $S_{B11}$: 1; $S_{B12}$: 0; $S_{B13}$: 1; $S_{B14}$: 0. The shot duration ranges for these buckets may be 1; 2; 3; 4; 5; 6; 7; 8; 10; 20; 23; 25; 980; 999, respectively. The confidence weights for the first video for the shot duration ranges shown are $C_{A1}$: 1; $C_{A2}$: 1; $C_{A3}$: 1; $C_{A4}$: 1; $C_{A5}$: 1; $C_{A6}$: 1; $C_{A7}$: 1; $C_{A8}$: 1; $C_{A9}$: 2; $C_{A10}$: 2; $C_{A11}$: 2; $C_{A12}$: 2; $C_{A13}$: 10; $C_{A14}$: 10. If only the confidence weight of the first video is used, then the $\text{Corr}_{AB}$ value is computed to be 8. The self-correlation value for video A is 24, and is 21 for the second video. The square root of the product of these self-correlation values is 22.45. The comparison value between 22.45 and 8 would be 8/22.45, which is approx. 0.3363, or 33.63%, which is below the threshold value (e.g., 50%), and so the correlation engine 170 determines that these two videos are dissimilar.

VII. Exemplary Flow for Determining Similarity Between Two Videos

Figure 6:
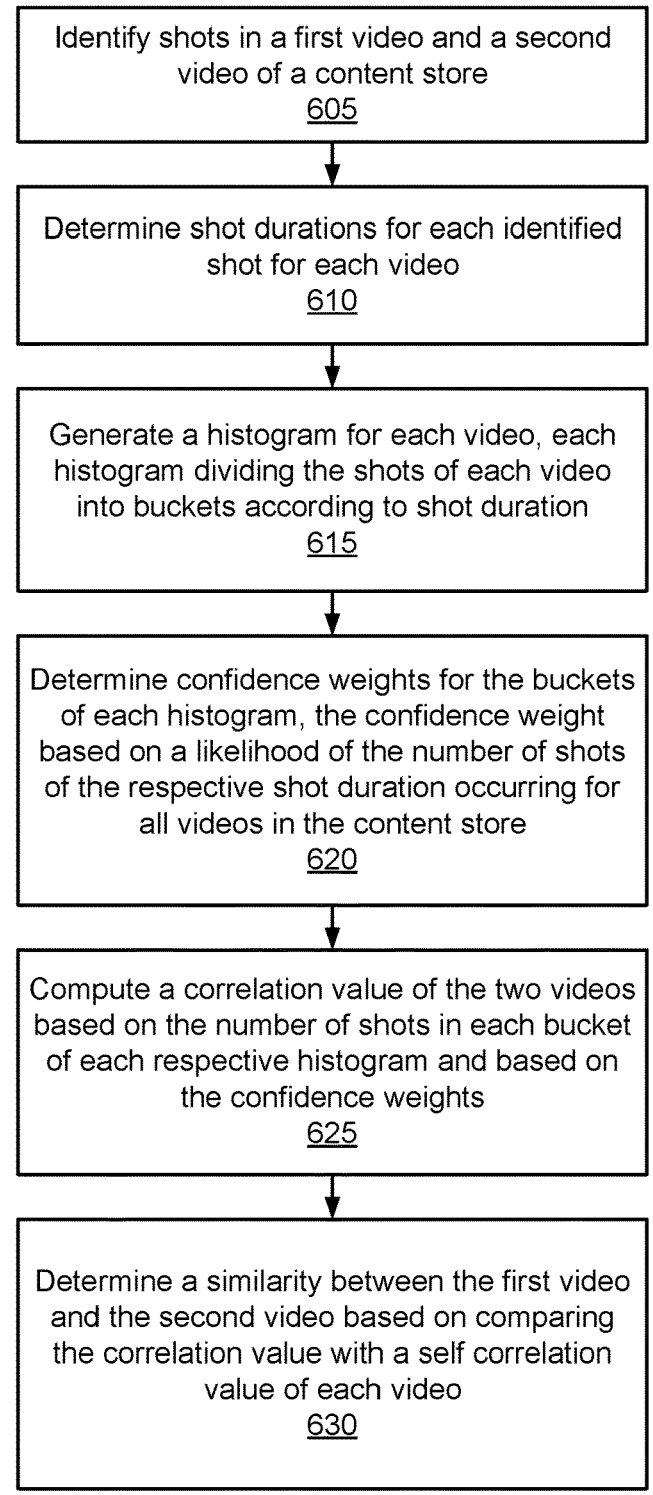
FIG. 6 is a flow diagram illustrating the actions of the content system for determining similarity between videos using shot duration correlation, according to one embodiment.

FIG. 6 is a flow diagram illustrating the actions of the content system 105 for determining similarity between videos using shot duration correlation, according to one embodiment. In one embodiment, the operations in the flow diagram are attributed to the content system 105.

Initially, the content system 105 identifies 605 shots in a first video and a second video of a content store. The content system 105 determines 610 shot durations for each identified shot for each video. These shot durations indicate the duration of shots in each video.

The content store 105 generates 615 a histogram for each video, each histogram dividing the shots of each video into buckets according to shot duration. As described above, the buckets of each histogram may encompass particular shot range durations. The shots of each video within a particular shot range duration are placed in the corresponding bucket.

The content store 105 determines 620 confidence weights for the buckets of each histogram, the confidence weight based on a likelihood of the number of shots of the respective shot duration occurring for all videos in the content store. The confidence weight may increase if the shot count in a bucket for a particular shot duration range is common, and vice versa.

The content system 105 computes 625 a correlation value of the two videos based on the number of shots in each bucket of each respective histogram and based on the confidence weights.

The content system 105 determines 630 a similarity between the first video and the second video based on comparing the correlation value with a self-correlation value of each video.

VIII. Other Considerations

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

It should be noted that the process steps and instructions are embodied in software, firmware or hardware, and when embodied in software, can be downloaded to reside on and be operated from different platforms used by a variety of operating systems.

The operations herein may also be performed by an apparatus. Furthermore, the computers referred to in the specification may include a single processor or may be architectures employing multiple processor designs for increased computing capability. It will be appreciated that a variety of programming languages may be used to implement the teachings of the present invention as described herein, and any references below to specific languages are provided for disclosure of enablement and best mode of the present invention. Additionally, the operations herein may be stored as instructions in a computer readable non-transitory storage medium of the apparatus and/or a computer.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which are set forth in the following claims.

What is claimed is:

1. A computer-implemented method comprising:
    identifying a first plurality of shots in a first video and a second plurality of shots in a second video; determining shot durations for each of the plurality of identified shots of the first video and the second video;
    generating a histogram for each of the first video and the second video, each histogram dividing the plurality of identified shots of the corresponding video into a set of buckets divided according to a range of shot durations;
    determining confidence weights for each bucket in the set of buckets of each histogram, wherein a confidence weight for a bucket is based on a likelihood of a particular number of identified shots occurring within the range of a shot duration for that bucket;
    computing a correlation value of the first video and the second video based on a number of identified shots in each bucket of each respective histogram and based on the confidence weights; and determining a similarity between the first video and the second video based on comparing the correlation value with a self-correlation value associated with each of the first video and the second video.

2. The method of claim 1, wherein the identifying a first plurality of shots in a first video and a second plurality of shots in a second video further comprises:
    for each of the first video and the second video:
        identifying intra-frame scores for frames of a video, the intra-frame scores indicating an amount of change between the frames of the video;
        determining that one or more of the intra-frame scores indicates a shot boundary in the video; and
        identifying the plurality of shots in the video, a shot in the plurality of shots separated by consecutive shot boundaries in the video.

3. The method of claim 1, wherein the determining shot durations for the identified shots of each of the first video and the second video further comprises:
    determining a number of frames within the identified shot of the video; and
    determining as a shot duration for the identified shot the number of frames within the shot.

4. The method of claim 1, wherein the generating the histogram for each of the first video and the second video further comprises:
    identifying a consecutive series of shot range durations; and
    assigning the identified shots of each of the first video and the second video to each bucket in the set of buckets of the histogram for each of the first video and the second video, the set of buckets of the histogram corresponding to the shot range durations, the identified shots assigned to each bucket the set of buckets such that the duration of the identified shots corresponds to the shot range duration of each bucket the set of buckets.

5. The method of claim 1, wherein the determining the confidence weights for each bucket the set of buckets of each histogram further comprises:
    determining probabilities of shot counts for each bucket the set of buckets in each histogram, the shot count for a bucket corresponding to the number of shots assigned to that bucket, the probability for that bucket indicating the likelihood that a video would have a number of shots within the shot duration range of that bucket equal to the shot count of that bucket; and determining a confidence weight for each bucket the set of buckets of the histogram, the confidence weight for the bucket having an inverse relationship to the probability of the shot count for that bucket.

6. The method of claim 5, wherein the probability for the bucket is further computed based on determining a Poisson probability of the shot count, the Poisson probability for the bucket computed based on an average shot count of shots in a set of sample videos that have shot durations within the shot duration range of that bucket.

7. The method of claim 6, wherein the set of sample videos is retrieved from a content store and shares one or more characteristics with at least one of the first video or the second video.

8. The method of claim 1, wherein the computing the correlation value further comprises:

computing an inner product of the shot counts of each bucket the set of buckets of each histogram of the first video and the second video, the shot count for a bucket corresponding to the number of shots assigned to that bucket, the shot counts for every bucket modified by the corresponding confidence weight for that bucket.

9. The method of claim 1, wherein the self-correlation value for each video is computed by:

computing an inner product of the shot counts of each bucket the set of buckets of the histogram for each video with the shot counts of the same buckets of the same histogram, the shot count for a bucket corresponding to the number of shots assigned to that bucket, the shot counts for every bucket modified by the corresponding confidence weight for that bucket.

10. The method of claim 9, wherein the determining the similarity between the first video and the second video further comprises:

determining a comparison ratio between the correlation value and a square root of a product of the self-correlation values of the first video and the second video; and in response to determining that the comparison ratio is above a threshold value, determining that the first video and the second video are similar.

11. The method of claim 1, wherein the confidence weight for a bucket is based on a likelihood of a particular number of identified shots occurring within the range of shot duration for that bucket for videos in the content store.

12. A computer program product comprising a non-transitory computer readable storage medium having instructions encoded thereon that, when executed by a processor, cause the processor to:

identify a first plurality of shots in a first video and a second plurality of shots in a second video;

determine shot durations for each of the plurality of identified shots of the first video and the second video;

generate a histogram for each of the first video and the second video, each histogram dividing the plurality of identified shots of the corresponding video into a set of buckets divided according to a range of shot durations;

determine confidence weights for each bucket in the set of buckets of each histogram, wherein a confidence weight for a bucket is based on a likelihood of a particular number of identified shots occurring within the range of a shot duration for that bucket;

compute a correlation value of the first video and the second video based on a number of identified shots in each bucket of each respective histogram and based on the confidence weights; and determine a similarity between the first video and the second video based on comparing the correlation value with a self-correlation value associated with each of the first video and the second video.

13. The computer program product of claim 12, wherein the non-transitory computer readable storage medium has further instructions for the identification of the first plurality of shots in a first video and a second plurality of shots in a second video, that when executed by a processor, cause the processor to:

for each of the first video and the second video:

identify intra-frame scores for frames of a video, the intra-frame scores indicating an amount of change between the frames of the video;

determine that one or more of the intra-frame scores indicates a shot boundary in the video; and identify the plurality of shots in the video, a shot in the plurality of shots separated by consecutive shot boundaries in the video.

14. The computer program product of claim 12, wherein the non-transitory computer readable storage medium has further instructions for the determination of shot durations for the identified shots of each of the first video and the second video, that when executed by a processor, cause the processor to:

determine a number of frames within the identified shot of the video; and determine as a shot duration for the identified shot the number of frames within the shot.

15. The computer program product of claim 12, wherein the non-transitory computer readable storage medium has further instructions for the generation of the histogram for each video, that when executed by a processor, cause the processor to:

identify a consecutive series of shot range durations; and assign the identified shots of each of the first video and the second video to each bucket in the set of buckets of the histogram for each of the first video and the second video, the set of buckets of the histogram corresponding to the shot range durations, the identified shots assigned to each bucket the set of buckets such that the duration of the identified shots corresponds to the shot range duration of each bucket the set of buckets.

16. The computer program product of claim 12, wherein the non-transitory computer readable storage medium has further instructions for the determination of the confidence weights for each bucket the set of buckets of each histogram, that when executed by a processor, cause the processor to:

determine probabilities of shot counts for each bucket the set of buckets in each histogram, the shot count for a bucket corresponding to the number of shots assigned to that bucket, the probability for that bucket indicating the likelihood that a video would have a number of shots within the shot duration range of that bucket equal to the shot count of that bucket; and determine a confidence weight for each bucket the set of buckets of the histogram, the confidence weight for the bucket having an inverse relationship to the probability of the shot count for that bucket.

17. The computer program product of claim 16, wherein the probability for the bucket is further computed based on determining a Poisson probability of the shot count, the Poisson probability for the bucket computed based on an average shot count of shots in a set of sample videos that have shot durations within the shot duration range of that bucket.

18. The computer program product of claim 17, wherein the set of sample videos is retrieved from a content store and shares one or more characteristics with at least one of the first video or the second video.

19. The computer program product of claim 12, wherein the non-transitory computer readable storage medium has further instructions for the computation of the correlation value, that when executed by a processor, cause the processor to:
 compute an inner product of the shot counts of each bucket the set of buckets of each histogram of the first video and the second video, the shot count for a bucket corresponding to the number of shots assigned to that bucket, the shot counts for every bucket modified by the corresponding confidence weight for that bucket.

20. The computer program product of claim 12, wherein the self-correlation value for each video is computed according to further instructions in the non-transitory computer readable storage medium, that when executed by a processor, cause the processor to:
 compute an inner product of the shot counts of each bucket the set of buckets of the histogram for each video with the shot counts of the same buckets of the same histogram, the shot count for a bucket corresponding to the number of shots assigned to that bucket, the shot counts for every bucket modified by the corresponding confidence weight for that bucket.

21. The computer program product of claim 20, wherein the non-transitory computer readable storage medium has further instructions for determination a similarity between the first video and the second video, that when executed by a processor, cause the processor to:
 determine a comparison ratio between the correlation value and a square root of a product of the self-correlation values of the first video and the second video; and
 in response to the determination that the comparison ratio is above a threshold value, determining that the first video and the second video are similar.

22. The computer program product of claim 12, wherein the confidence weight for a bucket is based on a likelihood of a particular number of identified shots occurring within the range of shot duration for that bucket for videos in the content store.

* * * * *